United States Patent [19]

Rattner et al.

[11] Patent Number: 4,819,638
[45] Date of Patent: Apr. 11, 1989

[54] APPARATUS FOR NON-CONTACTING DISINTEGRATION OF CALCULI

[75] Inventors: Manfred Rattner, Buckenhof; Erich Noske, Weher, both of Fed. Rep. of Germany

[73] Assignee: Siemens Aktiengesellschaft, Berlin and Munich, Fed. Rep. of Germany

[21] Appl. No.: 84,186

[22] Filed: Aug. 12, 1987

[30] Foreign Application Priority Data

Aug. 18, 1986 [DE] Fed. Rep. of Germany ....... 8622104

[51] Int. Cl.⁴ .............................................. A61B 17/00
[52] U.S. Cl. .................................. 128/328; 128/24 A; 73/11
[58] Field of Search ................. 73/11; 128/328, 24 A, 128/660, 1 R

[56] References Cited

U.S. PATENT DOCUMENTS

| | | | |
|---|---|---|---|
| 3,673,407 | 6/1972 | Wiswell, Jr. ........................... | 378/58 |
| 4,311,147 | 1/1982 | Hausler ................................ | 128/328 |
| 4,630,607 | 12/1986 | Duinker et al. .................... | 128/24 A |
| 4,665,543 | 5/1987 | Eusek et al. ......................... | 128/328 |
| 4,669,483 | 6/1987 | Hepp et al. .......................... | 128/328 |
| 4,693,247 | 9/1987 | Brisson et al. ...................... | 128/328 |
| 4,734,611 | 3/1988 | Granz .................................. | 310/324 |

FOREIGN PATENT DOCUMENTS 0131653 1/1985 European Pat. Off. ............ 128/328

Primary Examiner—John D. Yasko
Attorney, Agent, or Firm—Hill, Van Santen, Steadman & Simpson

[57] ABSTRACT

The present invention is directed to an improvement for an apparatus for non-contacting disintegration of calculi in the body of the patient by emitting a focus shock wave from an output end of fluid-filled shock wave tube which output end has a flexible membrane which can be yieldingly pressed against the patient to couple the device thereto characterized by a test device having a test member mount being attached to the output end of the shock wave tube and having an arrangement for position a test member at a proposed position of the focal point for the shock wave tube.

7 Claims, 1 Drawing Sheet

APPARATUS FOR NON-CONTACTING DISINTEGRATION OF CALCULI

BACKGROUND OF THE INVENTION

The present invention is directed to an apparatus for non-contacting disintegration of calculi in the body of a patient which apparatus comprises means for emitting a focused shock wave in a fluid-filled shock wave tube which is closed at its application side by a flexible membrane which is pressed against the patient and yields because of the fluid pressure in the tube.

An apparatus of the above type is employed for the disintegration of kidney stones. With the assistance of an X-ray means, the spatial position of the kidney stone can be located and the shock wave source can then be aligned relative to this kidney stone so the focal point for the shock wave source lies in the kidney stone. The kidney stone disintegrates due to the generation of a plurality of shock waves and the pieces are then eliminated in a natural way from the body of the patient.

It is necessary for an effective calculus disintegration that the location of the focal point of the shock wave source lies approximately in the center of the calculus. In addition to an exact location of the calculus, it is also required for this purpose that the position of the focal point of the shock wave source be precisely known. In practice, this means that the position of the focal point must lie at a prescribed, three-dimensional location in front of the shock wave source.

SUMMARY OF THE INVENTION

The object of the present invention is to construct an apparatus for non-contact disintegration of calculi in which the position of the focal point for the shock waves can be monitored in a very simple way.

This object is achieved in an apparatus for non-contacting disintegration of calculi in the body of a patient, said apparatus comprising means for emitting focused shock waves including a fluid-filled shock wave tube which has an application side terminating by a flexible membrane, said membrane being yieldingly pressed against the patient due to the fluid pressure in the tube to couple the apparatus to the patient. The improvement is that the test is a test member mount that can be attached to the application side of the shock wave tube, said test member mount containing a test member and means for holding the test member in the mount at the focal point of the shock waves of the apparatus.

In the apparatus of the invention, a test member mount can be attached over the membrane and comprises a receptacle for the test member, which is arranged so that the test member lies in the planned location of the focus of the shock wave source. When the test member is inserted into the receptacle and a trial shot or actuation of the shock wave source is made, then a determination can be made on the basis of the damage to the test member as to whether the actual position of the focal point coincides with the planned position for the focal point.

Other advantages and options were apparent from the following description of the preferred embodiments, drawings and claims.

DESCRIPTION OF PREFERRED EMBODIMENTS

Figure 1:
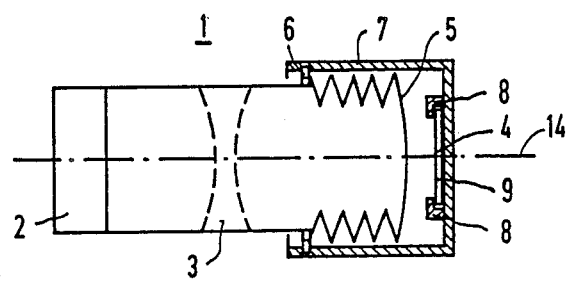
FIG. 1 is a longitudinal cross-sectional view with portions in elevation for purposes of illustration of an apparatus with the improved test device of the present invention.

The principles of the present invention are particularly useful in a test device to be used with a shock wave tube 1 as illustrated in FIG. 1.

The shock wave tube 1 has a shock wave generator 2, which is positioned at one end of the tube 1. The tube 1 includes an accoustical lens 3 on its insides for focusing the shock wave admitted by the shock wave generator 2 onto a range or focal point 4 on an axis 14. The shock wave tube 1 is filled with a fluid, for example water, as a coupling medium and is terminated on its output or application end by a flexible membrane 5 that can be yieldingly pressed against the patient due to the fluid pressure in the tube.

In order to check whether the actual position of the focal point coincides with the planned position, the shock wave tube 1 includes a test arrangement or device that has a fastening means 6 adjacent the application side for detachably connecting a test member mount 7 to the shock wave tube 1. The fastening means or mechanism 6 can be fashioned in the manner of a bayonet joint or closure. The mount 7 includes a receptical 8 which is illustrated as being formed by two rails for providing means for mounting a plate-shaped test member 9. The geometrical dimensions of the mount 7 and the position of the receptacle 8 are selected so that a marking provided on the test member 9 such as shown as a cross 10 in FIG. 2 lies precisely at the intended focal point 4 of the tube 1. When a shock wave is triggered given the attached mount 7 and the test member 9 lying in the receptacle 8, then the shock wave leads to damage to the test member 9. With reference to the position of this damage relative to the marking on the test member 9, the actual position of the focal point can be identified and a correction can be made as needed.

Figure 2:
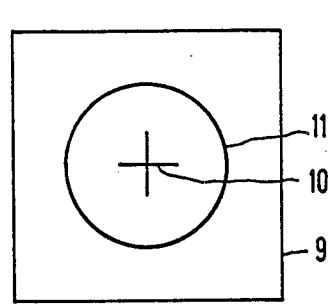
FIG. 2 is a plan view of a test member used in the apparatus of the test mount of FIG. 1.

As illustrated in FIG. 2, the plate-shaped test member has a cross 10 as a marking which is surrounded by a circle 11. When the damage produced by a generation of shock wave lies inside the circle 11, then it can be assumed that the actual position of the focal point lies within allowable tolerances. When the damage occurs outside of the circle 11, then a correction must be carried out.

The test member 9 is preferably composed of a material that can be disintegrated by shock waves generated by shock wave generator 2. An example of such materials are ceramics and plaster.

Figure 3:
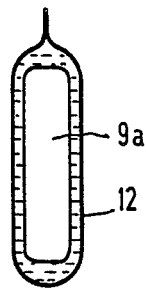
FIG. 3 is a cross-sectional view with portions in elevation for purposes of illustration of an embodiment of a test member which is usable in the test device of FIG. 1.

In accordance with the embodiment of FIG. 3, the test member 9a is received in a foil package 12 which is composed of a bonded film of thermal-plastic material. The package 12 is also filled with a fluid such as water as a coupling agent. However, it can also be possible to employ a plate-shaped test member without further packaging, as shown in FIG. 2.

The test member 9a allows an identification of the position of the focal point 4 along the axis 14 of the shock wave generator 1. This is possible on the basis of the position of the erosion that is produced by the shock waves on the test member 9a. For example whether it is on the front surface or the back surface on the member 9a.

Although various minor modifications may be suggested by those versed in the art, it should be understood that we wish to embody within the scope of the patent granted hereon, all such modifications as reasonably and properly come within the scope of our contribution of the art.

We claim:

1. A test device in combination with an apparatus for non-contacting disintegration of calculi in the body of a patient, said apparatus including a fluid-filled shock wave tube having a source of shock waves and means for focusing the shock waves at a pre-determined point, said tube on an output end being terminated by a flexible membrane which enables yieldingly pressing the tube against the patient to couple the apparatus to the patient, the test device comprising a test member and a test member mount, said mount having means for detachably connecting the mount to the output end of the shock tube and means for holding the test member in a proposed focal point for the shock wave tube, said test member being a plate member of a material, which will be disintegrated by shock waves, and said means for holding the test member including a receptacle for receiving said plate member.

2. A test device according to claim 1, wherein the plate member is a plate of ceramic material.

3. A test device according to claim 1, wherein said plate member is a plate of plaster.

4. In an apparatus according to claim 1, wherein a plate member is provided with markings for the focal point.

5. A test device in combination with an apparatus for non-contacting disintegration of calculi in the body of a patient, said apparatus including a fluid-filled shock wave tube having a source of shock waves and means for focusing the shock waves at a pre-determined point, said tube on an output end being terminated by a flexible membrane which enables yieldingly pressing the tube against the patient to couple the apparatus to the patient, the test device comprising a test member and a test member mount, said mount having means for detachably connecting the mount to the output end of the shock tube and means for holding the test member in a proposed focal point for the shock tube, said test member being a plate member of a material which will be disintegrated by shock waves, said test member being received in a seal foil package containing a coupling fluid, said means for holding a test member gripping said package with the plate member therein.

6. A test device according to claim 5, wherein the test member is composed of ceramic material.

7. A test device according to claim 5, wherein the test member is composed of plaster.

* * * * *